US006941159B2

(12) United States Patent
Tsai et al.

(10) Patent No.: US 6,941,159 B2
(45) Date of Patent: Sep. 6, 2005

(54) METHOD FOR AUTOMATICALLY CONVERTING A STORED TELEPHONE NUMBER OF CELLULAR PHONE FOR DIALING IN A DIFFERENT COUNTRY

(75) Inventors: Tony Tsai, Taipei Hsieng (TW); Zhu-Min Di, Shanghai (CN)

(73) Assignee: Inventec Appliances Corp., Taipei Hsieng (TW)

( * ) Notice: Subject to any disclaimer, the term of this patent is extended or adjusted under 35 U.S.C. 154(b) by 563 days.

(21) Appl. No.: 10/155,117

(22) Filed: May 28, 2002

(65) Prior Publication Data

US 2004/0204118 A1 Oct. 14, 2004

(51) Int. Cl.[7] .................................................. H04B 1/38
(52) U.S. Cl. .................... 455/564; 455/433; 455/432.1; 455/445; 455/434; 455/435; 455/456; 709/228
(58) Field of Search ............................. 455/433, 432.1, 455/445, 434, 435, 456; 209/228

(56) References Cited

U.S. PATENT DOCUMENTS

| | | | | |
|---|---|---|---|---|
| 5,978,678 A | * | 11/1999 | Houde et al. | 455/433 |
| 6,259,914 B1 | * | 7/2001 | Koster | 455/432.1 |
| 6,587,688 B1 | * | 7/2003 | Chambers et al. | 455/433 |
| 2001/0049738 A1 | * | 12/2001 | Doi | 709/228 |

* cited by examiner

*Primary Examiner*—Emmanuel L. Moise
*Assistant Examiner*—David Q. Nguyen
(74) *Attorney, Agent, or Firm*—Bacon & Thomas, PLLC

(57) ABSTRACT

The invention relates to a method for automatically converting a telephone number for dialing in a different country, which comprises the steps of establishing a destination reference table including essential data, setting a roaming place table, establishing a telephone book in the cellular phone, selecting a telephone number from the telephone book, searching the essential data from the destination reference table for making a call in a roaming place selected from the roaming place table based on the selected roaming place by a CPU of the cellular phone, modifying the searched telephone number based on a predetermined rule, and dialing the modified telephone number from the cellular phone in the roaming place.

9 Claims, 1 Drawing Sheet

METHOD FOR AUTOMATICALLY CONVERTING A STORED TELEPHONE NUMBER OF CELLULAR PHONE FOR DIALING IN A DIFFERENT COUNTRY

FIELD OF THE INVENTION

The present invention relates to dialing by means of cellular phone and more particularly to a method for automatically converting a stored telephone number of cellular phone into one to be adapted for dialing in a different country.

BACKGROUND OF THE INVENTION

Cellular phones have been popular worldwide in recent years due to its portability, multifunction, and inexpensive unit price as a communication device for social or business purpose. In an important application, an international roaming is effected by means of cellular phone. Further, as compared to conventional wire telephones cellular phones have advantages in certain fields such as convenience in an outdoor environment and portability. An additional feature of newly developed cellular phone is an embedded software called telephone book. The telephone book is comprised of a plurality of addresses stored in its memory. Each address comprises a name of a person and an associated telephone number to contact with. In use, a calling party can select a serial number corresponding to the desired name and telephone number. Once selected, the telephone number is dialed automatically.

Typically, a telephone number is set based on place where a person associated with the telephone number (i.e., resident place) prior to storing the set telephone number in the telephone book of cellular phone. For example, for Taipei residents, telephone numbers are classified either as ones belonging to the same country code or ones belonging to different country codes. Further, as to a telephone number of a country, it consists of area code and local telephone number. For example, a person may have telephone numbers such as 034780000, 0222873333, and 075872541 stored in his/her cellular phone in which 03, 02, and 07 are area codes and 4780000, 22873333, and 5872541 are local telephone numbers. Furthermore, for Taiwan residents as to telephone numbers belonging to different countries, each one consists of international code, country code, area code, and local telephone number. For example, telephone number of a friend living in Shanghai, China may be stored as 002862167654321 while telephone number of another friend living in Tokyo, Japan may be stored as 00281333933600 in which 002 is Taiwan's international code, 86 and 81 are country codes of China and Japan respectively, 21 and 3 are area codes of Shanghai and Tokyo respectively, and 67654321 and 33933600 are local telephone numbers respectively. In some countries, the international code may be replaced by a symbol of "+". Hence, above telephone numbers of 002862167654321 and 00281333933600 may be stored as +862167654321 and +81333933600 respectively. Similarly, in use, a calling party can select a serial number corresponding to the desired name and telephone number. Once selected, the telephone number is dialed automatically.

Above dialing procedure is only applicable to calls made within the resident place. In other words, it is not applicable to calls made while roaming. In fact, a calling party has to make some adjustments to a desired telephone number based on difference between the same telephone number dialed in resident place and roaming place. For example, a calling party desires to dial a telephone number associated with resident place from a roaming place, numeral "0" in the area code has to be replaced by country code of resident place and international code of roaming place sequentially in the telephone number because dialing of the telephone number associated with resident place is not applicable to dial an international call at the same country. Typically, area code of domestic call has a numeral "0" in the beginning while the numeral "0" has to be removed while making an international call. For example, in a case that the roaming place is China above telephone numbers such as 034780000, 0222873333, and 075872541 belonging to friends in Taiwan (i.e., resident place) are required to modify as 0088634780000, 00886222873333, and 0088675872541 prior to making a successful dialing. As to making a call to a friend living in Tokyo, Japan, the international code of the called party's telephone number (e.g., 002) has to be replaced by numerals "00" in advance. In other words, telephone number of 00281333933600 has to be changed as 0081333933600 prior to making a call. As to making a call to a friend living in Shanghai, China, the international code and the country code of the called party's telephone number (e.g., 00286) has to be replaced by numerals "0" in advance. That is, telephone number of 002862167654321 has to be changed as 02167654321 prior to making a call. Only above adjustments have been made, a calling party can make a call successfully to a telephone number by selecting a corresponding serial number from telephone book while roaming.

However, the prior art suffered from several disadvantages. For example, a cellular phone user can not easily identify the adjusted telephone number. Moreover, another adjustment procedure has to be performed with respect to above adjusted telephone numbers after the cellular phone user has returned to his/her resident place. This is a tedious and time consuming process. To the worse, it can be very bothersome and bring much inconvenience to a cellular phone user who frequently travels to different countries.

Thus, it is desirable to provide a novel method for automatically converting a stored telephone number of cellular phone into one to be adapted for dialing in a different country in order to overcome the above drawbacks of prior art.

SUMMARY OF THE INVENTION

It is therefore an object of the present invention to provide a method for automatically converting a telephone number for dialing in a different country comprising the steps of establishing a destination reference table including essential data; setting a roaming place table of the cellular phone; establishing a telephone book having names of persons and associated telephone numbers listed sequentially in the cellular phone; selecting a telephone number from the telephone book; searching the essential data from the destination reference table necessary for making a call in a roaming place selected from the roaming place table based on the selected roaming place by a CPU of the cellular phone; modifying the searched telephone number based on a predetermined rule; and dialing the modified telephone number from the cellular phone in the roaming place.

In one aspect of the present invention, the essential data comprises destinations, countries, international codes, country codes, area codes, and whether it supports symbols in a cellular phone so that the CPU of the cellular phone is capable of identifying the international code, the country code, the area code, and the symbol of the telephone number based on the destination reference table prior to modifying the telephone number in the telephone book of the cellular phone to be dialed.

The above and other objects, features and advantages of the present invention will become apparent from the following detailed description taken with the accompanying drawings.

Definitions

Figure 1:
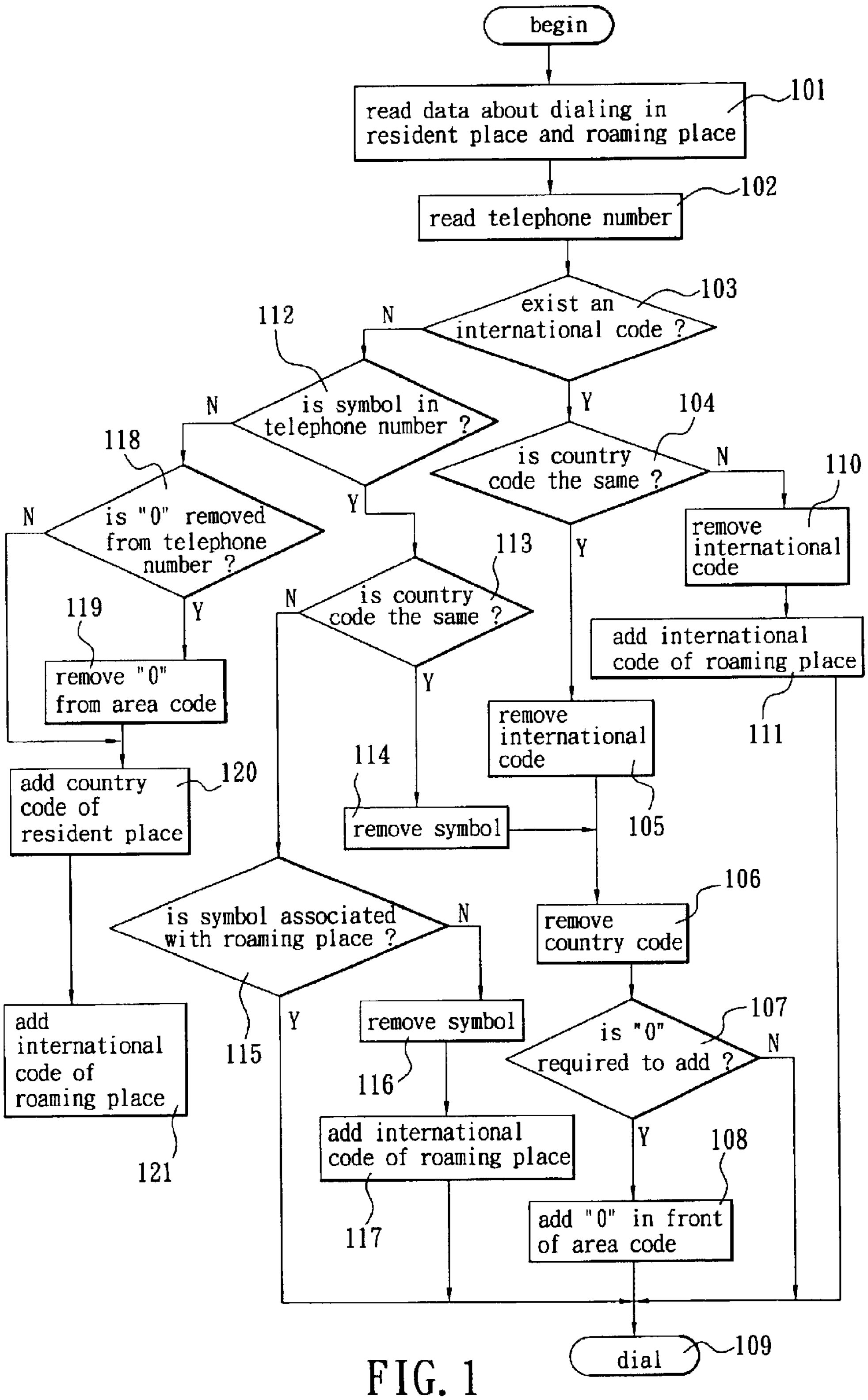
FIG. 1 is a flow chart diagram illustrating a preferred embodiment of process according to the invention.

As used herein, an electronic device is a cellular phone.

As used herein, resident place means that a place where a cellular phone user lives while working, etc. For a sufficient long period of time. As to telephone numbers contained in telephone book of a cellular phone belonging to the user they are set and stored based on the resident place.

As used herein, roaming place means that a place where the cellular phone user travels for a short period of time.

DETAILED DESCRIPTION OF THE PREFERRED EMBODIMENTS

The invention is directed to a method for automatically converting a telephone number for dialing in a different country comprising the steps of establishing a destination reference table including essential data including destinations, countries, international codes, country codes, area codes, and whether it supports symbols in a cellular phone; setting a roaming place table of the cellular phone; establishing a telephone book having names of persons and associated telephone numbers listed sequentially in the cellular phone; selecting a telephone number from the telephone book; searching the essential data from the destination reference table necessary for making a call in a roaming place selected from the roaming place table based on the selected roaming place by a CPU of the cellular phone; modifying the searched telephone number based on a predetermined rule; and dialing the modified telephone number from the cellular phone in the roaming place.

Referring to FIG. 1, there is shown a process in accordance with the invention. It is contemplated that once a calling party selected a serial number corresponding to the desired name of person and telephone number from telephone book available to an electronic device, a CPU of the cellular phone may perform the following steps accordingly.

In step 101, read data about dialing from a destination reference table below based on resident place and roaming place.

| Destination | Country code | Area code | International code |
|---|---|---|---|
| Taipei | 886 | 2 | 002 |
| Tokyo | 81 | 3 | 001 |
| Atlanta | 1 | 404 | 011 |
| Boston | 1 | 617 | 011 |
| Shanghai | 86 | 21 | 00 |
| . . . | . . . | . . . | . . . |

In step 102, read a telephone number from a telephone book table below.

| Serial number | Name | Telephone number |
|---|---|---|
| 1 | Smith, C | 0229838308 |
| 2 | Carter, S | 0028621234000 |
| 3 | Nixon, W | +8333933600 |
| . . . | . . . | . . . |

In step 103, a determination is made as to whether an international code is contained in the telephone number. If yes, the process goes to step 104. Otherwise, the process jumps to step 112.

In step 104, a determination is made as to whether country code contained in the telephone number is the same as that of roaming place based on destination reference table. If yes, the process goes to step 105. Otherwise, the process jumps to step 110.

In step 105, remove international code from the telephone number.

In step 106, remove country code from the telephone number.

In step 107, a determination is made as to whether a numeral "0" is required to add in front of area code of the telephone number based on destination reference table. If yes, the process goes to step 108. Otherwise, the process jumps to step 109.

In step 108, add numeral "0" in front of area code of the telephone number.

In step 109, dial the modified telephone number.

In step 110, remove international code from the telephone number.

In step 111, add international code of roaming place to take the place of the removed international code in step 110. Then the process jumps back to step 109.

In step 112, a determination is made as to whether a symbol is contained in the telephone number. If yes, the process goes to step 113. Otherwise, the process jumps to step 118.

In step 113, a determination is made as to whether country code contained in the telephone number is the same as that of roaming place based on destination reference table. If yes, the process goes to step 114. Otherwise, the process jumps to step 115.

In step 114, remove the symbol from the telephone number. Next, the process jumps back to step 106.

In step 115, a determination is made as to whether there is a symbol associated with roaming place based on destination reference table. If yes, the process jumps to step 109. Otherwise, the process goes to step 116.

In step 116, remove the symbol from the telephone number.

In step 117, add international code of roaming place to take the place of the removed symbol in step 116. Then the process jumps back to step 109.

In step 118, a determination is made as to whether numeral "0" is required to remove from the telephone number based on destination reference table. If yes, the process goes to step 119. Otherwise, the process jumps to step 120.

In step 119, remove numeral "0" from area code of the telephone number.

In step 120, add country code of resident place to take the place of the removed numeral "0" in step 119 or in front of the telephone number if numeral "0" is not removed based on destination reference table.

In step 121, add international code of roaming place in front of the country code in step 120 based on destination reference table prior to dialing the modified telephone number.

Following is an exemplary example for further illustrating the process of the invention. A cellular phone user has a residence in Taipei (i.e., resident place). A telephone book having content as shown in above telephone book table is installed in the user's cellular phone. In a case that the user travels to China (i.e., roaming place) Taipei is set as resident place. International code and country code of Taipei are 002 and 886 respectively based on destination reference table. Numeral "0" contained in area code has to be removed from the telephone number in making an international call. To the contrary, numeral "0" has to be contained in area code of telephone number prior to making a domestic call. Note that international code and country code of China are 00 and 86 respectively. In use, the user (i.e., calling party) can select a serial number corresponding to the desired name and telephone number from telephone book. For example, telephone numbers of Smith, C, Carter, S, and Nixon, W in formats as 00886229838308, 0212340000, and 0081333933600 are to be dialed while roaming in China.

In brief, by utilizing the invention there is no complicated procedure required for a cellular phone user to follow to make a call while roaming in a different country since a conversion process of a telephone number to be dialed from telephone book of the electronic device has been done automatically once the telephone number is selected.

While the invention has been described by means of specific embodiments, numerous modifications and variations could be made thereto by those skilled in the art without departing from the scope and spirit of the invention set forth in the claims.

What is claimed is:

1. A method for automatically converting a telephone number for dialing in a different country comprising the steps of:

establishing a destination reference table including essential data in a cellular phone;

setting a roaming place table of the cellular phone; and establishing a telephone book having names of persons and associated telephone numbers listed sequentially in the cellular phone;

wherein once a user has selected a telephone number from the telephone book, performing the steps of:

reading data about dialing from the destination reference table;

reading the telephone number from the telephone book;

determining whether the international code is contained in the telephone number;

when the international code is contained in the telephone number, determining whether the country code contained in the telephone number is the same as that of the roaming place based on the destination reference table;

when the international code is not contained in the telephone number, removing the international code from the telephone number and adding the international code of the roaming place to take the place of the removed international code prior to dialing;

when the country code contained in the telephone number is the same as that of the roaming place based on the destination reference table, removing the international code from the phone number and removing the country code from the telephone number;

determining whether a numeral "0" is required to be added in front of the area code of the telephone number based on the destination reference table;

when the numeral "0" is required to be added on front of the area code of the telephone number based on the destination reference table, adding the numeral "0" in front of the area code of the telephone number; and dialing the telephone number.

2. The method of claim 1, wherein the essential data comprises destinations, countries, international codes, country codes, area codes and whether symbols are supported, so that the cellular telephone is capable of identifying the international code, the country code, the area code, and the symbol of the telephone number based on the destination reference table.

3. The method of claim 1, further comprising the steps of, when the international code is not contained in the telephone number:

determining whether a symbol is contained in the telephone number;

when the symbol is contained in the telephone number, determining whether the country code contained in the telephone number is the same as that of the roaming place based on the destination reference table;

when the symbol is contained in the telephone number, determining whether the country code contained in the telephone number is the same as that of the roaming place based on the destination reference table and removing the symbol from the telephone number;

removing the country code from the telephone number;

determining whether the numeral "0" is required to be added in front of the area code for the telephone number based on the destination reference table; and when the numeral "0" is required to be added in front of the area code of the telephone number based on the destination reference table, adding the numeral "0" in front of the area code of the telephone number or else dialing the telephone number which does not contain the symbol and the country code.

4. The method of claim 3, further comprising the steps of, when the symbol is contained in the telephone number and the country code contained in the telephone number is not the same as that of the roaming place based on the destination reference number:

determining whether the symbol is associated with the roaming place based on the destination reference table;

wen the symbol is associated with the roaming place based on the destination reference table, dialing the telephone number or else removing the symbol from the telephone number and adding the international code of the roaming place to take the place of the removed symbol prior to dialing the telephone number.

5. The method of claim 3, further comprising the steps of, when the symbol is not contained in the telephone number:

determining whether the numeral "0" is required to be removed from the telephone number based on the destination reference table;

when the numeral "0" is required to be removed from the telephone number based on the destination reference table, removing the numeral "0" from the area code of the telephone number;

adding the country code of a resident place to take the place of the removed numeral "0" ; and adding the international code of the roaming place in front of the country code based on the destination reference table prior to dialing the telephone number.

6. The method of claim 5, further comprising the steps of, when the numeral "0" is not required to be removed from the telephone number based on the destination reference table:

adding the country code of the resident place to take the place of the removed numeral "0" based on the destination reference table; and adding the international code for the roaming place in front of the country code based on the destination reference table prior to dialing the telephone number.

7. The method of claim 1, wherein the resident place is a place where the user lives while working for a predetermined long period of time.

8. The method of claim 1, wherein the telephone numbers contained in the telephone book of the cellular phone belonging to the user are set and stored based on the resident place.

9. The method of claim 1, wherein the roaming place is a place where the user travels for less than a predetermined short period of time.

* * * * *